(12) United States Patent
Liu et al.

(10) Patent No.: US 11,364,999 B2
(45) Date of Patent: Jun. 21, 2022

(54) ROTOR, POWER ASSEMBLY AND AIR VEHICLE

(71) Applicant: SZ DJI TECHNOLOGY CO., LTD., Shenzhen (CN)

(72) Inventors: Feng Liu, Shenzhen (CN); Shufeng Zhang, Shenzhen (CN); Tao Deng, Shenzhen (CN); Peng Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 78 days.

(21) Appl. No.: 16/743,815

(22) Filed: Jan. 15, 2020

(65) Prior Publication Data
US 2020/0148343 A1   May 14, 2020

Related U.S. Application Data

(63) Continuation of application No. PCT/CN2017/094933, filed on Jul. 28, 2017.

(51) Int. Cl.
*B64C 27/473* (2006.01)
*B64C 27/46* (2006.01)
(Continued)

(52) U.S. Cl.
CPC .......... *B64C 27/473* (2013.01); *B64C 27/463* (2013.01); *B64C 27/467* (2013.01);
(Continued)

(58) Field of Classification Search
CPC .................................................... B64C 27/467
See application file for complete search history.

(56) References Cited

U.S. PATENT DOCUMENTS

| | | | |
|---|---|---|---|
| 4,329,115 A | 5/1982 | Kress | |
| 5,927,948 A * | 7/1999 | Perry | B64C 27/463 |
| | | | 416/228 |

(Continued)

FOREIGN PATENT DOCUMENTS

| | | |
|---|---|---|
| CN | 1077928 A | 11/1993 |
| CN | 1714022 A | 12/2005 |

(Continued)

OTHER PUBLICATIONS

The World Intellectual Property Organization (WIPO) International Search Report for PCT/CN2017/094933 dated Feb. 13, 2018 7 Pages.

*Primary Examiner* — Juan G Flores
(74) *Attorney, Agent, or Firm* — Anova Law Group, PLLC

(57) ABSTRACT

A propeller includes a blade. The blade includes a blade root, a blade tip disposed away from the blade root, a blade front surface, and a blade back surface. The blade also includes a front edge connecting a first side of each of the blade front surface and the blade back surface. The blade also includes a rear edge connecting a second side of each of the blade front surface and the blade back surface. The blade further includes a first suppression member formed by a portion of the front edge adjacent to the blade tip bending toward a first direction. The first direction is a direction from the front edge to the rear edge. The first suppression member is configured to suppress a spanwise air flow.

21 Claims, 17 Drawing Sheets

(51) Int. Cl.
*B64C 27/467* (2006.01)
*B64C 27/50* (2006.01)
*F01D 5/02* (2006.01)
*F01D 5/30* (2006.01)

(52) U.S. Cl.
CPC ............... *B64C 27/50* (2013.01); *F01D 5/02* (2013.01); *F01D 5/30* (2013.01); *B64C 2201/108* (2013.01); *B64C 2201/165* (2013.01)

(56) References Cited

U.S. PATENT DOCUMENTS

| | | | |
|---|---|---|---|
| 9,776,706 B2 * | 10/2017 | Ghapgharan | A63H 27/02 |
| 10,017,249 B1 * | 7/2018 | Tseng | B64C 27/20 |
| 10,661,891 B2 * | 5/2020 | Baek | B64C 27/48 |
| 2007/0201982 A1 | 8/2007 | Neumeier | |
| 2017/0129597 A1 | 5/2017 | Lauder et al. | |

FOREIGN PATENT DOCUMENTS

| | | |
|---|---|---|
| CN | 101387262 A | 3/2009 |
| CN | 102745328 A | 10/2012 |
| CN | 204916181 U | 12/2015 |
| CN | 105474216 A | 4/2016 |
| CN | 205872440 U | 1/2017 |
| CN | 206297727 U | 7/2017 |
| CN | 207045700 U | 2/2018 |
| WO | 2007147177 A2 | 12/2007 |

* cited by examiner

ROTOR, POWER ASSEMBLY AND AIR VEHICLE

CROSS-REFERENCE TO RELATED APPLICATION

This application is a continuation application of International Application No. PCT/CN2017/094933, filed on Jul. 28, 2017, the entire content of which is incorporated herein by reference.

TECHNICAL FIELD

The present disclosure relates to a rotor (also referred to as a propeller), a power assembly (also referred to as a propulsion assembly), and an air vehicle (also referred to as an aircraft), which belong to the technical field of air vehicle.

BACKGROUND

The rotor/propeller is a key component of a rotorcraft, which may be configured to convert the rotation output from an electric motor or an engine to a propulsion force or lifting force to realize the ascending and descending, turning, and hovering, etc. Because of the structure and operation characteristics of the rotor/propeller, when it rotates, a blade having a predetermined thickness periodically sweep through the surrounding air medium, causing air microclusters to perform periodic unsteady movement, thereby generating thickness noise. At the meantime, the pressure field on the surface of the blade may change, thereby generating the negative load noise. The thickness noise and the negative load noise may combine together to become a major portion of the aircraft noise, which may contaminate the surrounding air space environment. Such noise may also propagate to the aircraft body of the aircraft, causing vibration of the aircraft body, which may seriously affect the flight safety of the aircraft.

SUMMARY

In accordance with an aspect of the present disclosure, there is provided a propeller including a blade. The blade includes a blade root, a blade tip disposed away from the blade root, a blade front surface, and a blade back surface. The blade also includes a front edge connecting a first side of each of the blade front surface and the blade back surface. The blade also includes a rear edge connecting a second side of each of the blade front surface and the blade back surface. The blade further includes a first suppression member formed by a portion of the front edge adjacent to the blade tip bending toward a first direction. The first direction is a direction from the front edge to the rear edge. The first suppression member is configured to suppress a spanwise air flow.

In accordance with an aspect of the present disclosure, there is provided a propulsion assembly. The propulsion assembly includes a driving member and a propeller. The propeller includes a blade including a blade root and a blade tip disposed away from the blade root. The propeller also includes a blade hub connected with an output shaft of the driving member. The blade also includes a blade front surface, a blade back surface, a front edge connecting a first side of each of the blade front surface and the blade back surface, and a rear edge connecting a second side of each of the blade front surface and the blade back surface. The blade further includes a first suppression member formed by a portion of the front edge adjacent to the blade tip bending toward a first direction. The first direction is a direction from the front edge to the rear edge. The first suppression member is configured to suppress a spanwise air flow.

In accordance with an aspect of the present disclosure, there is provided an aircraft. The aircraft includes an aircraft frame, an aircraft arm, and a propulsion assembly. An end of the aircraft arm is connected with the aircraft frame, the other end of the aircraft arm is connected with the propulsion assembly. The propulsion assembly includes a driving member and a propeller. The propeller includes a blade including a blade root and a blade tip disposed away from the blade root, and a blade hub connected with an output shaft of the driving member. The blade also includes a blade front surface, a blade back surface, a front edge connecting a first side of each of the blade front surface and the blade back surface, and a rear edge connecting a second side of each of the blade front surface and the blade back surface. The propeller further includes a first suppression member formed by a portion of the front edge adjacent to the blade tip bending toward a first direction. The first direction being a direction from the front edge to the rear edge. The first suppression member is configured to suppress a spanwise air flow.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DESCRIPTION OF MAJOR ELEMENT LABEL

110—blade root;
120—blade tip;
130—blade front surface;
140—blade back surface;
150—front edge;
160—rear edge;
170—mounting hole;
180—first suppression member;
190—second suppression member;
200—blade hub;
210—connection hole;
220—first connection member;
230—second connection member;
240—third connection member;
10—aircraft frame;
20—aircraft arm;
30—propulsion assembly.

DETAILED DESCRIPTION OF THE EMBODIMENTS

Next, some embodiments of the present disclosure will be described in detail with reference to the accompanying drawings. When there is no obvious conflict, the embodiments and the features of the embodiments may be combined.

Figure 1:
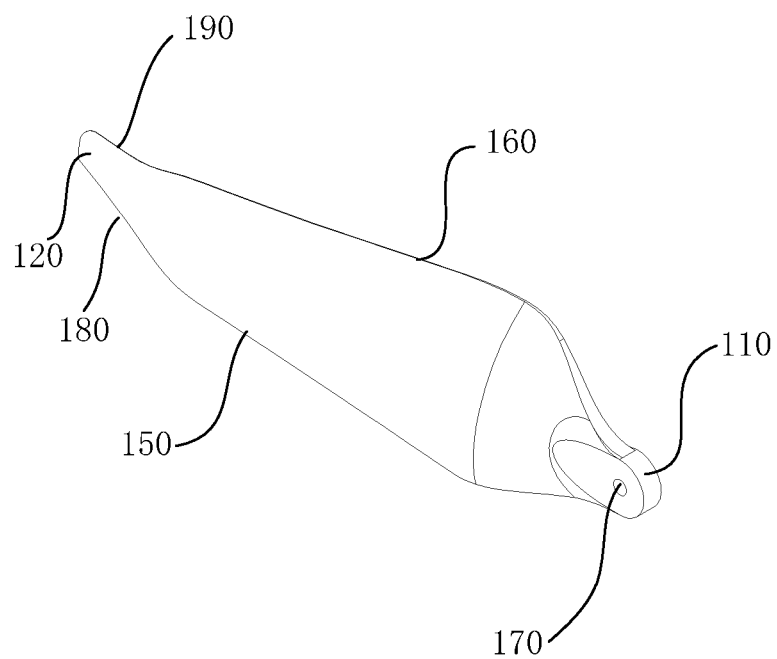
FIG. 1 is a schematic illustration of a structure of a blade, according to an example embodiment.
Figure 2:
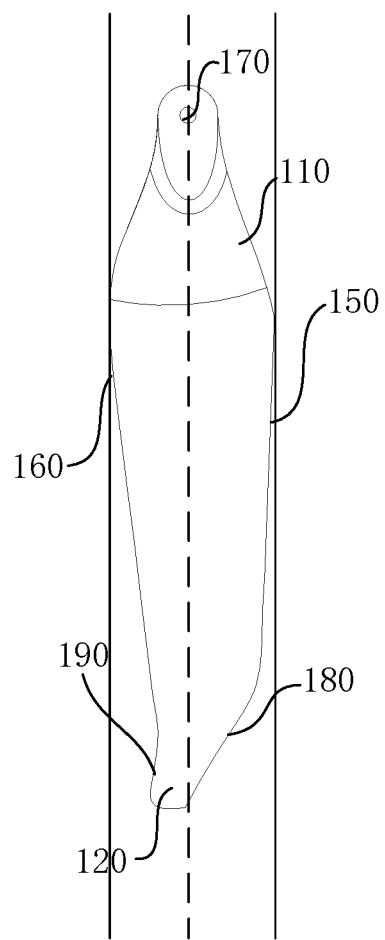
FIG. 2 is a front view of the structure shown in FIG. 1, according to an example embodiment.
Figure 3:
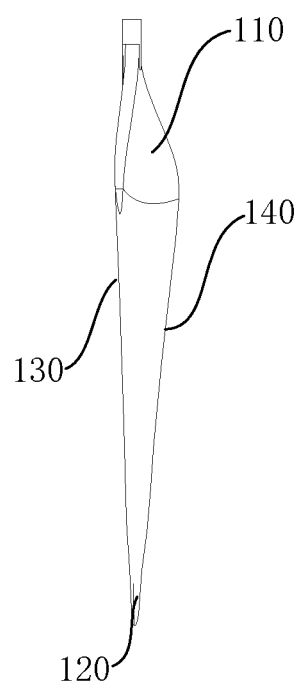
FIG. 3 is a right view of the structure shown in FIG. 1, according to an example embodiment.
Figure 4:
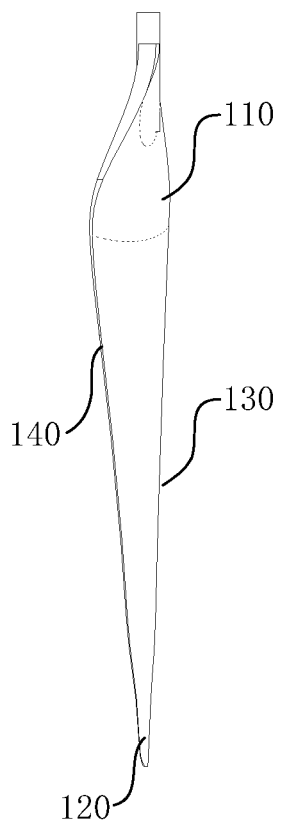
FIG. 4 is a left view of the structure shown in FIG. 1, according to an example embodiment.
Figure 5:
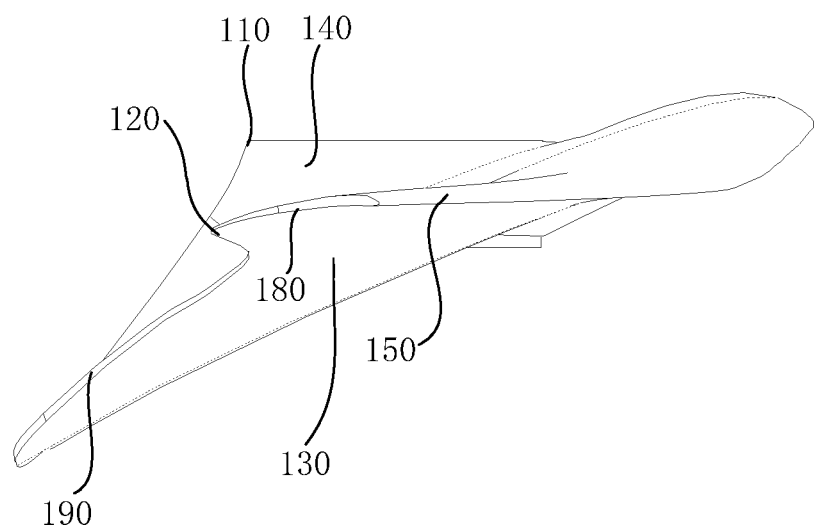
FIG. 5 is a bottom view of the structure shown in FIG. 1, according to an example embodiment.
Figure 6:
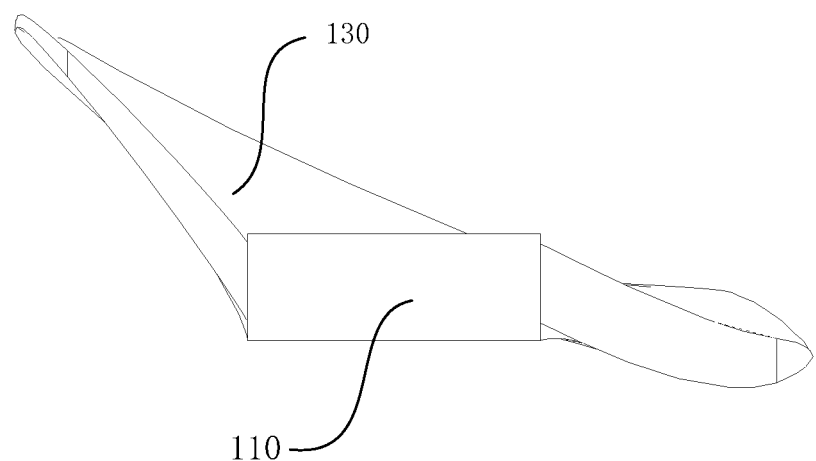
FIG. 6 is a top view of the structure shown in FIG. 1, according to an example embodiment.

FIG. 1 shows a structure of a blade according to an embodiment of the present disclosure. FIG. 2 is a front view of the structure shown in FIG. 1. FIG. 3 is a right view of the structure shown in FIG. 1. FIG. 4 is a left view of the structure shown in FIG. 1. FIG. 5 is a bottom view of the structure shown in FIG. 1. FIG. 6 is a top view of the structure shown in FIG. 1.

As shown in FIG. 1-FIG. 6, the propeller of the present disclosure is included in a propulsion assembly, which may be a blade driven by an electric motor or an engine to rotate to generate a lifting force or a propulsion force. The blade may include a blade root 110 fixed onto a wheel hub and a blade tip 120 facing away from the blade root 110. When the propeller operates, the blade rotates around a rotation center, thereby forming a propeller disk, to disturb the air flow to generate a lifting force or a propulsion force to cause the manned or unmanned aircraft to move, such as an airship or a rotor-based unmanned aerial vehicle. The blade of the present disclosure may be manufactured using any suitable material available in the current technologies, including, but not limited to, steel, aluminum alloy, plastics, carbon fiber, etc. During manufacturing, various processing techniques available in the current technologies may be used, such as molding, stamping, and forging.

The blade may include a blade front surface 130 and a blade back surface 140, a front edge 150 connecting a side of each of the blade back surface 140 and the blade back surface 140, and a rear edge 160 connecting another side of each of the blade front surface 130 and the blade back surface 140. The blade back surface 140 is a side of the blade that faces upwardly during a flight of the aircraft. The blade front surface 130 is a side of the blade that faces downwardly (or faces the ground) during the flight of the aircraft.

A portion of the front edge 150 adjacent to the blade tip 120 may bend in a first direction to form a first suppression member 180. The first suppression member 180 may be configured to suppress the spanwise flow. The first direction is a direction from the front edge 150 to the rear edge 160. Specifically, in FIG. 2, the front edge 150 bends to the left to form the first suppression member 180. The first suppression member 180 may cut the spanwise flow of the air on the blade when the blade rotates, thereby reducing the turbulence generated by the blade tip 120 and reducing the intensity of the turbulence at the tip blade 120, thereby reducing the degree of changes in air pressure adjacent to the blade tip, and reducing the degree of periodically cutting the air flow by the blade having a predetermined thickness, and further reducing the rotation noise generated by the rotating blade of the propeller.

In some embodiments, the specific location of the first suppression member 180 may be configured based on the specific requirement on the overall noise of the aircraft and the aerodynamic efficiency. When configuring the location of the first suppression member 180, two aspects may be considered: locations of the first suppression member 180 and the blade tip 120, and a distance from the first suppression member 180 to the center of the propeller disk.

For example, as shown in FIG. 2, in one embodiment, the blade includes a central axis line (shown as a dotted line extending through the center of the blade). The front edge 150 and the rear edge 160 of the blade each include a tangent parallel with the central axis line (shown as solid lines located on the left side and right side of the blade, respectively). The first suppression member 180 and the blade tip 120 may be disposed between the two tangents. A person having ordinary skills in the art can appreciate, the locations of the first suppression member 180 and the blade tip 120 do not limit the propeller of the present disclosure. In some practical configurations, it is possible that only one of the first suppression member 180 and the blade tip 120 is disposed between the two tangents. By disposing the first suppression member 180, the blade tip 120, or both between the two tangents, the aerodynamic efficiency of the propeller is not substantially affected while the rotation noise of the propeller is reduced, thereby achieving a balance between an excellent flight performance and a relatively small noise of the propeller.

As another example, in another embodiment, a ratio between a distance from the first suppression member 180 to a center of the propeller disk formed by the rotating blade and a radius of the propeller may be 79.4%-88.8%, such that the first suppression member 180 may not substantially affect the aerodynamic efficiency of the propeller while reducing the noise of the propeller.

It can be understood that the above two embodiments may be combined, such that while the rotation noise of the propeller is reduced, the aerodynamic efficiency of the propeller can be maintained to be substantially consistent with that of a typical rectangular propeller. The rectangular propeller is a propeller in which the blade tip 120 has a rectangular shape.

Referring to FIG. 1 and FIG. 2, in some embodiments, a portion of the rear edge 160 adjacent to the blade tip 120 also bends in the first direction to form a second suppression member 190 configured to suppress the spanwise air flow. Specifically, as shown in FIG. 2, a portion of the rear edge 160 adjacent to the blade tip 120 bends to the left to form the second suppression member 190. Similarly, when configuring the location of the second suppression member 190, as in configuring the first suppression member 180, the following factors may be considered: a degree of bending of the second suppression member 190 and the blade tip 120, and a distance from the second suppression member 190 to the center of the propeller disk. For example, in some embodiments, the second suppression member 190 may be located between two tangents that are parallel with the central axis line, thereby achieving a balance between reducing the noise of the propeller and maintaining the aerodynamic efficiency of the propeller to be substantially the same as that of a typical rectangular propeller.

In some embodiments, as shown in FIG. 3 and FIG. 4, the blade back surface 140 and the blade front surface 130 may be configured as curved surfaces. The trend of the curve may be: when the blade is in an overall horizontal state, the location of the front edge 150 is lower than the location of the rear edge 160. By configuring the blade back surface 140 and the blade front surface 130 of the blade as curved surfaces, i.e., by configuring the surfaces of the blade to have a smooth transition, such that there is no sudden twist portion in the blade. As a result, the stress in the blade is relatively small, the strength is relatively high, which makes it not easy to be fractured, and the reliability is relatively high.

Referring to FIG. 3 and FIG. 4, the thickness of the blade may gradually reduce from the blade root 110 to the blade tip 120, making the end of the blade farthest from the center of the propeller disk to be the thinnest part of the blade, which can reduce the resistance of the air and improve the flight performance of the propeller.

In some embodiments, as shown in FIG. 1 and FIG. 2, the front edge 150 may be provided with an arched portion having a curved surface shape. The arched portion may be connected with the remaining portions of the front edge 150 in a smooth transition. Specifically, FIG. 2 shows that the arched portion of the blade is disposed at a location adjacent to the blade root 110 and the arched portion faces to the right.

In the propeller of the present disclosure, by forming the first suppression member 180 through bending the portion of the front edge 150 adjacent to the blade tip 120 toward the rear edge 160, the spanwise air flow on the blade may be cut, thereby reducing the formation of the blade tip turbulence or reducing the intensity of the blade tip turbulence. As a result, the rotation noise of the propeller in the rotation process may be reduced, and the safety of the manned or unmanned aircraft (e.g., UAV or airship) may be enhanced.

Figure 7:
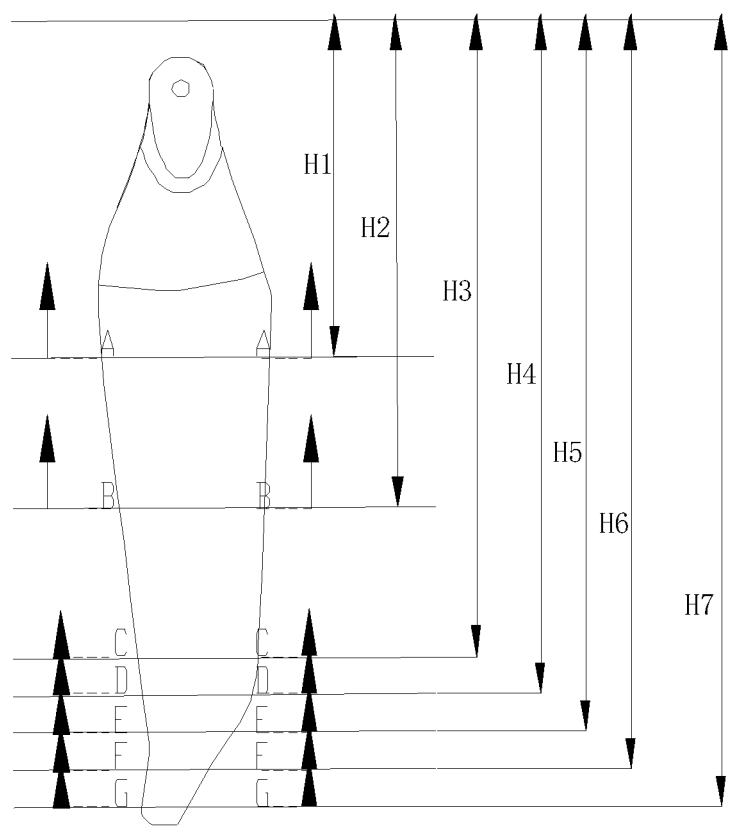
FIG. 7 shows the locations of the cross sections of a blade, according to an example embodiment.
Figure 8:
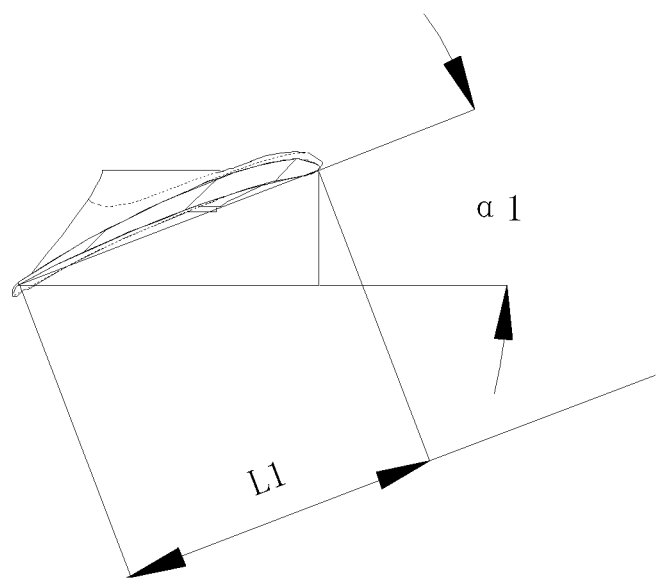
FIG. 8 is a cross-sectional view along the A-A line shown in FIG. 7, according to an example embodiment.
Figure 9:
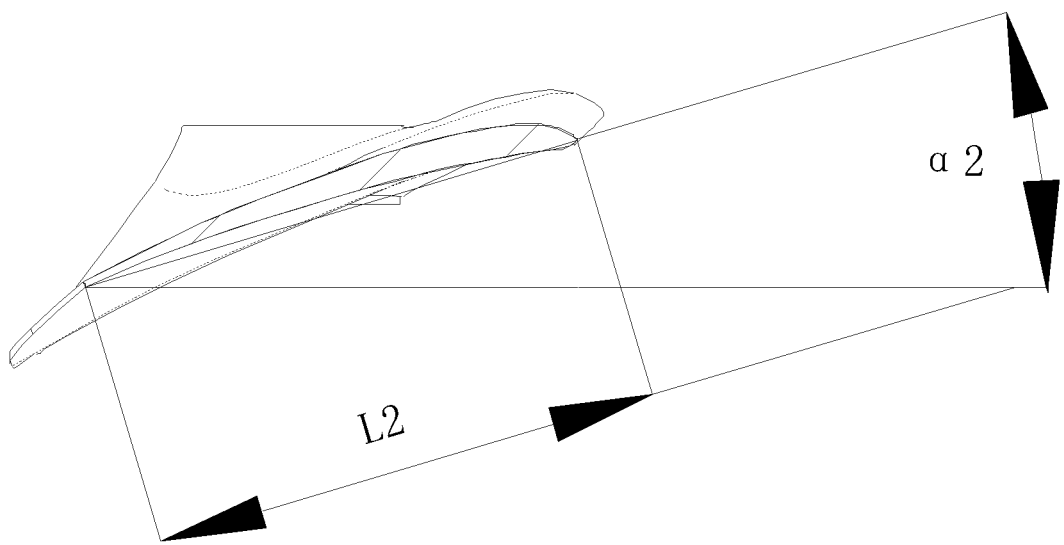
FIG. 9 is a cross-sectional view along the B-B line shown in FIG. 7, according to an example embodiment.
Figure 10:
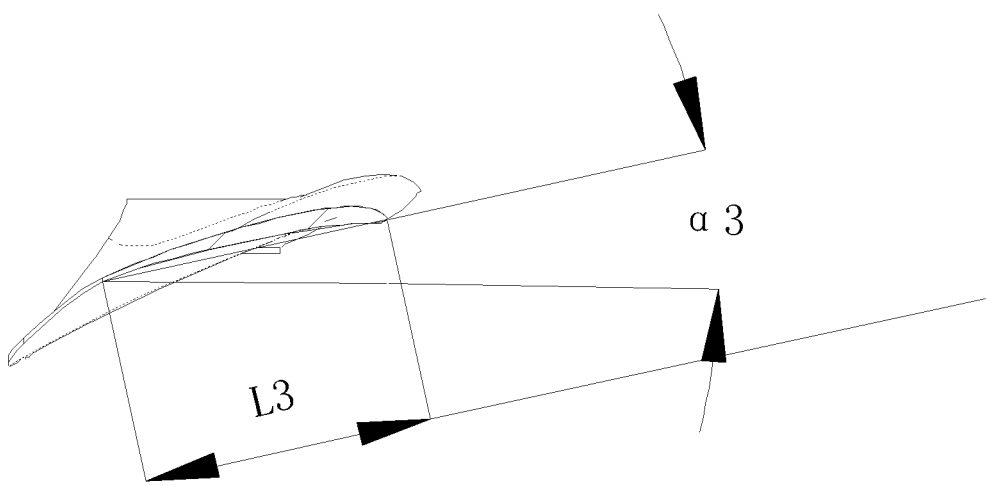
FIG. 10 is a cross-sectional view along the C-C line shown in FIG. 7, according to an example embodiment.
Figure 11:
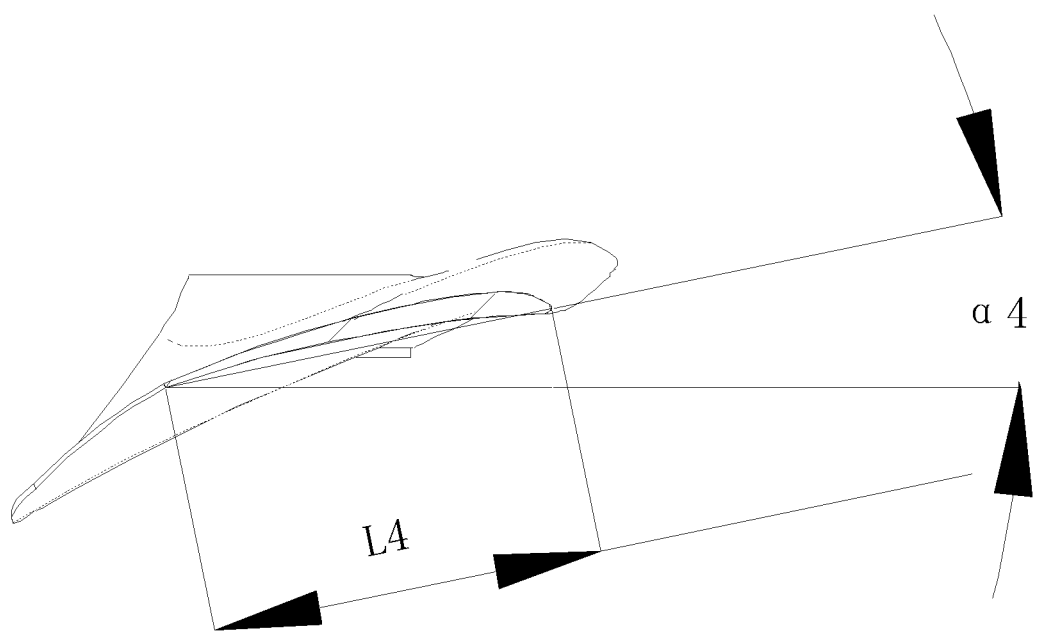
FIG. 11 is a cross-sectional view along the D-D line shown in FIG. 7, according to an example embodiment.
Figure 12:
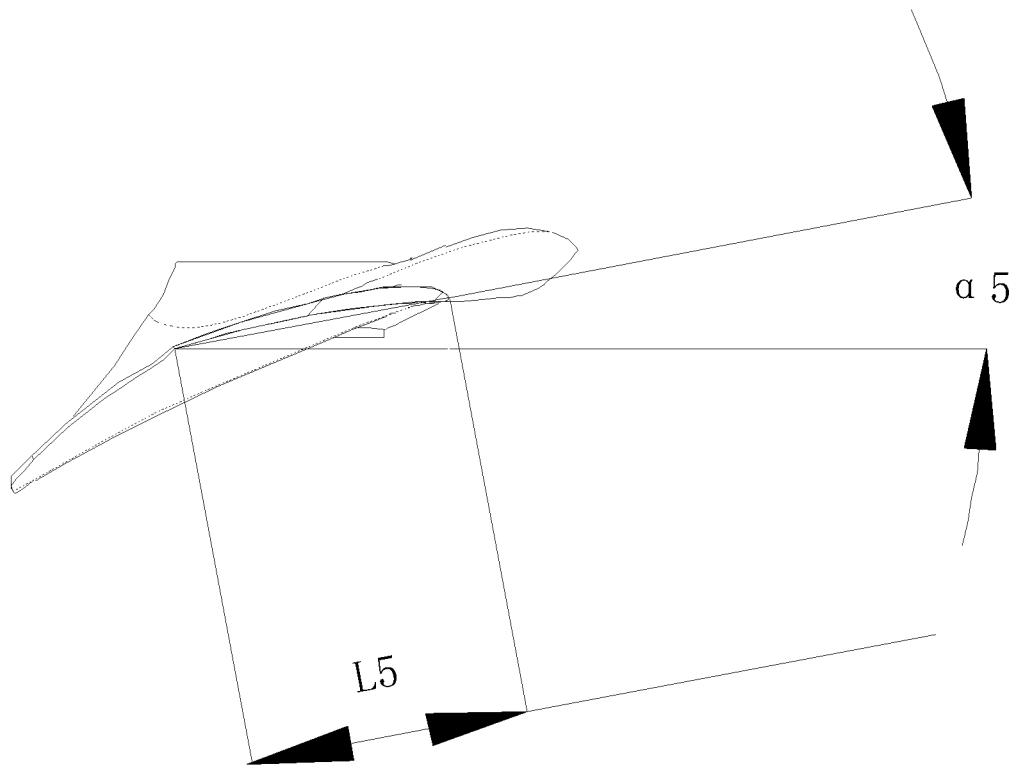
FIG. 12 is a cross-sectional view along the E-E line shown in FIG. 7, according to an example embodiment.
Figure 13:
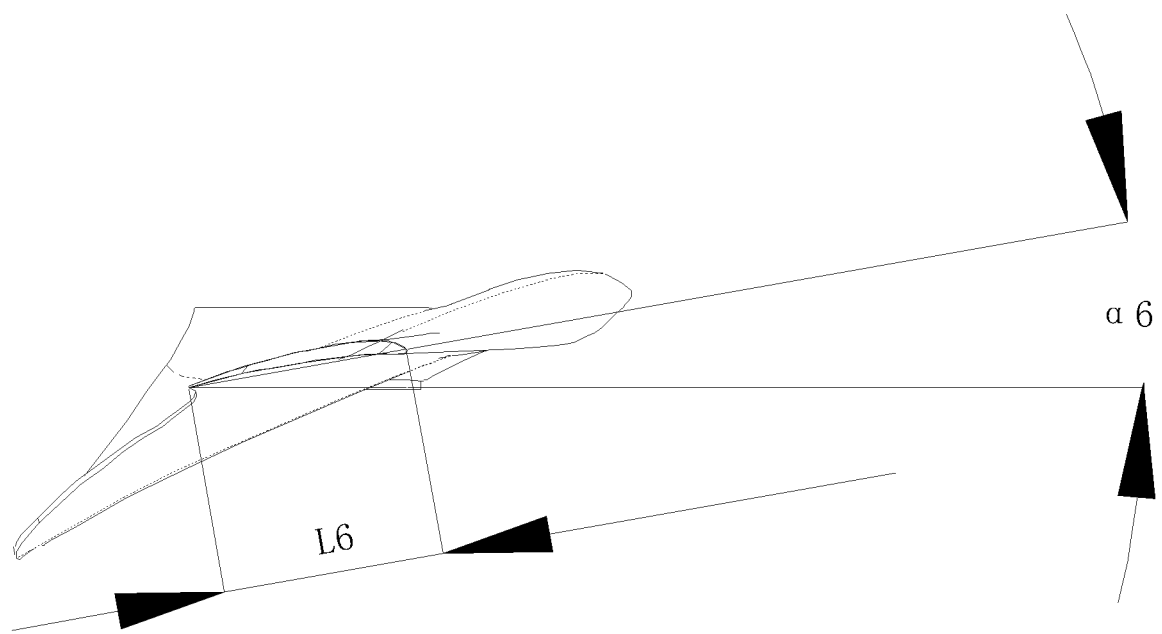
FIG. 13 is a cross-sectional view along the F-F line shown in FIG. 7, according to an example embodiment.
Figure 14:
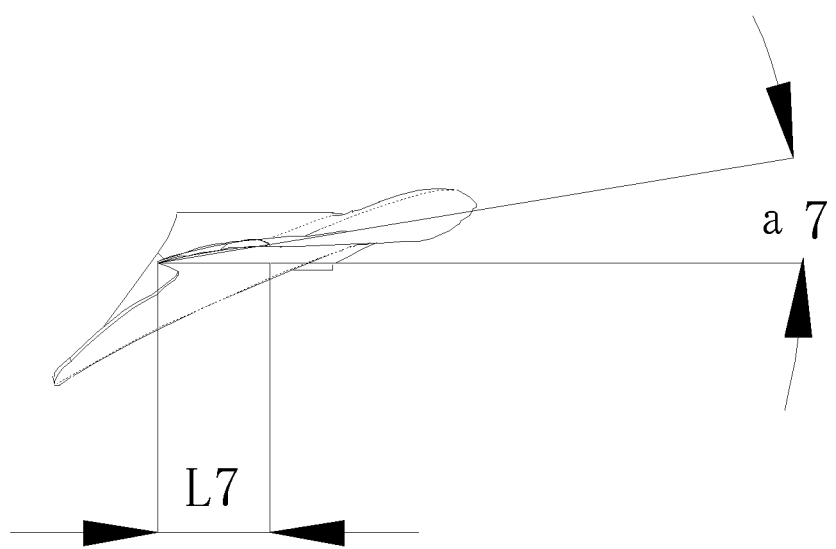
FIG. 14 is a cross-sectional view along the G-G line shown in FIG. 7, according to an example embodiment.

FIG. 7 schematically illustrates the locations of the cross sections of the blade. FIG. 8 is a cross-sectional view along the A-A line of the structure shown in FIG. 7. FIG. 9 is a cross-sectional view along the B-B line of the structure shown in FIG. 7. FIG. 10 is a cross-sectional view along the C-C line of the structure shown in FIG. 7. FIG. 11 is a cross-sectional view along the D-D line of the structure shown in FIG. 7. FIG. 12 is a cross-sectional view along the E-E line of the structure shown in FIG. 7. FIG. 13 is a cross-sectional view along the F-F line of the structure shown in FIG. 7. FIG. 14 is a cross-sectional view along the G-G line of the structure shown in FIG. 7.

As shown in FIG. 7-FIG. 13, the present disclosure provides an embodiment that has been improved in size suitable for rotor-based unmanned aerial vehicle. A person having ordinary skills in the art can directly or after simple modification, apply the embodiments to other manned or unmanned aircrafts.

Specifically, in this embodiment, the sizes of the seven cross sections of the blade of the rotor-based unmanned aerial vehicle are improved. The improvement in the sizes at the C-C cross section, D-D cross section, and E-E cross section can bring great advantages:

At a location about 79.4% from the center of the propeller disk, i.e., at the C-C cross section that has a distance of H3 from the center of the propeller disk as shown in FIG. 7, the chord length L3 of the blade, as shown in FIG. 10, is about 16.39 mm±5 mm, the angle of attack $\alpha 3$ is about 12.94°±2.5°. The chord length refers to, at the cross section, a horizontal distance between a leftmost end point of the front edge 150 at the cross section and a rightmost end point of the rear edge 160 at the cross section. The angle of attack is an angle between a line connecting the leftmost end point of the front edge 150 at the cross section and the rightmost end point of the rear edge 160 at the cross section and the horizontal direction, or, the angle of attack can be understood as an angle between the chord wing of the blade and the incoming direction of the air flow.

At a location about 84.1% from the center of the propeller disk, i.e., at the D-D cross section that has a distance of H4 from the center of the propeller disk as shown in FIG. 7, the chord length L4 of the blade as shown in FIG. 11 is about 15.05 mm±5 mm, the angle of attack $\alpha 4$ is about 11.55°±2.5°.

At a location about 88.8% from the center of the propeller disk, i.e., at the E-E cross section that has a distance of H5 from the center of the propeller disk as shown in FIG. 7, the chord length L5 of the blade as shown in FIG. 12 is about 11.42 mm±5 mm, the angle of attack $\alpha 5$ is about 10.69°±2.5°.

In this embodiment, by setting the chord lengths and the angles of attack at the three cross sections of the blade, the rotation noise generated by the propeller during the rotation process can be reduced, and the safety of the aircraft can be enhanced. In addition, the aerodynamic efficiency of the aircraft is not affected.

On the basis of the above embodiments, improvements may be made for the chord lengths and angles of attack at the A-A cross section, B-B cross section, F-F cross section, and G-G cross section, thereby further reducing the rotation noise generated by the propeller during the rotation process, and improving the safety performance of the aircraft.

At a location about 42.1% from the center of the propeller disk, i.e., at the A-A cross section that has a distance H1 from the center of the propeller disk as shown in FIG. 7, the chord length L1 of the blade, as shown in FIG. 8, is about 23.98 mm±5 mm, the angle of attack $\alpha 1$ is about 20.96°±2.5°.

At a location about 60.7% from the center of the propeller disk, i.e., at the B-B cross section that has a distance H2 from the center of the propeller disk as shown in FIG. 7, the chord length L2 of the blade, as shown in FIG. 9, is about 20.03 mm±5 mm, the angle of attack $\alpha 2$ is about 16.61°±2.5°.

At a location about 93.5% from the center of the propeller disk, i.e., at the F-F cross section that has a distance H6 from the center of the propeller disk as shown in FIG. 7, the chord length L6 of the blade, as shown in FIG. 13, is about 8.29 mm±5 mm, the angle of attack $\alpha 6$ is about 10.04°±2.5°.

At a location about 98.1% from the center of the propeller disk, i.e., at the G-G cross section that has a distance H7 from the center of the propeller disk as shown in FIG. 7, the chord length L7 of the blade, as shown in FIG. 14, is about 6.18 mm±5 mm, the angle of attack $\alpha 7$ is about 9.35°±2.5°.

A person having ordinary skills in the art can appreciate that the locations of the above cross sections A-A, B-B, F-F, and G-G are not limited to the above embodiments, which may be changed slightly.

For the above embodiments, the present disclosure provides a specific propeller. The diameter of the propeller is 107 mm, the length of the blade is 95 mm. At a location about 85 mm from the center of the propeller disk, the chord length of the blade is 16.39 mm, the angle of attack is 12.94°. At a location about 90 mm from the center of the propeller disk, the chord length of the blade is 15.05 mm, the angle of attack is 11.55°. At a location about 95 mm from the center of the propeller disk, the chord length of the blade is 11.42 mm, and the angle of attack is 10.69°.

Further, at a location about 45 mm from the center of the propeller disk, the chord length of the blade is 23.98 mm, the angle of attack is 20.96°. At a location about 65 mm from the center of the propeller disk, the chord length of the blade is 20.03 mm, the angle of attack is 16.61°. At a location about 100 mm from the center of the propeller disk, the chord length of the blade is 8.29 mm, the angle of attack is 10.04°. At a location about 105 mm from the center of the propeller disk, the chord length of the blade is 6.18 mm, the angle of attack is 9.35°. It can be understood that because the locations of the cross sections A-A, B-B, F-F, and G-G may be slightly changed, correspondingly, the angles of attack and the chord lengths at the cross sections A-A, B-B, F-F, and G-G may be correspondingly changed.

In some embodiments, the pitch of the propeller may be 31 mm, i.e., the distance of rise is 31 mm when the propeller rotates one circle.

For the above propeller of the present embodiment, when compared with a propeller of a conventional technology, the overall noise may be reduced from 72 dB to 69 dB, and the hovering power consumption of the propeller may only reduce by 4-5%. That is, the above propeller can have an excellent aerodynamic efficiency while having a reduced noise.

Figure 15:
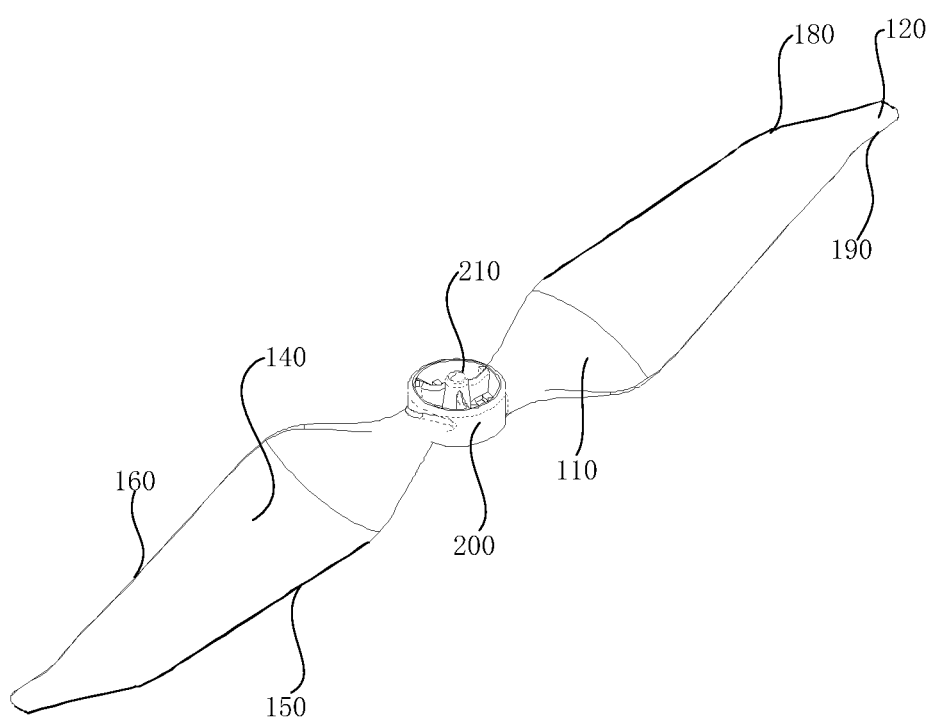
FIG. 15 is a schematic illustration of a propeller, according to an example embodiment.

Further, the propeller of the present embodiment can be suitable for dual-axis aircraft, quad-axis aircraft, or octa-axis aircraft. FIG. 15 is a schematic illustration of a structure of the propeller according to an embodiment. As shown in FIG. 15, the propeller may include a blade hub 200. The blade hub 200 may be connected with two, three, or more than three blades. The blade hub 200 may cause the blades to rotate to form the propeller disk. The blade hub 200 and the blades may be an integrally structure. Alternatively, the propeller may be a separate-body propeller, in which the blades may be individually and separately mounted onto the blade hub 200. For example, a mounting hole 170 may be formed at the blade root 110 of the blade. The blade may be mounted to the blade hub 200 through the mounting hole 170.

Specifically, the propeller may be a self-tightening blade as shown in FIG. 15. The blade hub 200 of the self-tightening blade may include a connection hole 210 configured for connecting with an output shaft of the electric motor. In some embodiments, the self-tightening blade means that the blade hub 200 of the propeller is provided with a self-locking mechanism coupled with the aircraft body. When the connection hole 210 of the blade hub 200 is sleeve-fit onto the output shaft of the electric motor and when the aircraft is started up, the self-locking mechanism provided on the aircraft body and the blade hub 200 may tightly lock the propeller on the aircraft body, thereby avoiding ejecting of the blade or crash. For example, a groove may be provided on the blade hub 200, and a pawl controlled by a cam mechanism may be provided on the aircraft body. When the aircraft is started up, the cam mechanism may rotate to cause the pawl to move in an axial direction of the blade hub 200 to tightly lock the blade hub 200. Alternatively, a disk-shaped structure may be controlled by an electromagnet to move along an axial direction of the blade hub 200, thereby tightly pressing the wheel hub between the disk-shaped structure and the aircraft body to realize the tight locking of the blade hub 200 having multiple blades.

Figure 16:
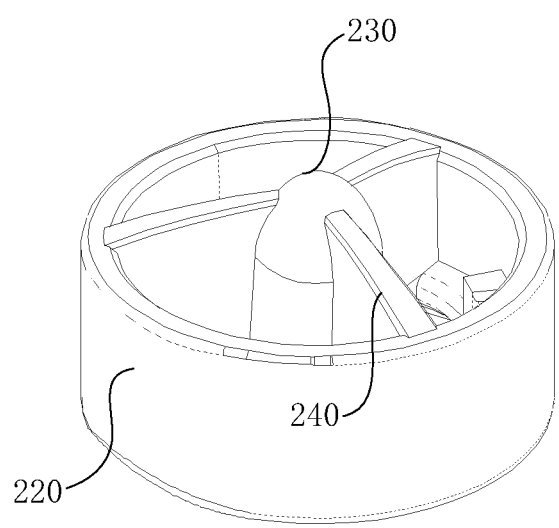
FIG. 16 is a schematic illustration of a wheel hub, according to an example embodiment.

The propeller may be a foldable propeller. The multiple blades and arms may be folded to be parallel with the aircraft body or close to the aircraft body to reduce the volume of the aircraft for the convenience of transportation and storage. FIG. 16 is a schematic illustration of a structure of a wheel hub of a foldable propeller. As shown in FIG. 16, the blade hub 200 of the foldable propeller may include a first connection member 220, a second connection member 230, and a third connection member 240. The first connection member 220 may be connected with the blades. For example, a fastener may penetrate through the mounting hole 170 provided on the blade root 110 of the blade to fix the blade on the first connection member 220. The second connection member 230 may be connected with a driving member. For example, the second connection member 230 may be sleeve-fit onto the output shaft of the electric motor or the engine, such that the electric motor or the engine drive the wheel hub to cause the blades to rotate, to form the propeller disk, thereby generating a lifting force or a propulsion force to drive the manned or unmanned aircraft to move. The third connection member 240 may be disposed between the first connection member 220 and the second connection member 230 to connect the first connection member 220 and the second connection member 230.

In some embodiments, the aircraft may include two, three, or more than three third connection members 240, separately disposed between the first connection member 220 and the second connection member 230. The multiple third connection members 240 may be uniformly disposed between the first connection member 220 and the second connection member 230. For example, three third connection members 240 may be uniformly disposed between the first connection member 220 and the second connection member 230.

In the foldable propeller of the present disclosure, by connecting the first connection member 220 and the second connection member 230 through the third connection member 240, the weight of the propeller can be reduced, and the flight performance of the propeller can be enhanced. In particular, when the blade hub 200 and the blades of the propeller are an integral structure, the flight performance can be significantly improved. The third connection member 240 separately disposed between the first connection member 220 and the second connection member 230 can not only improve the structural strength of the propeller, but also improve the stability of the propeller during a flight, thereby improving the flight performance of the propeller. When manufacturing the blade hub 200, the connection portions between the third connection member 240 and the first connection member 220 and the second connection member 230 may have a smooth transition, thereby reducing the stress at the connection portions, and improving the reliability of the blade hub 200.

A person having ordinary skills in the art can appreciate that the propeller can be a normal rotation propeller or a reverse rotation propeller. The normal rotation propeller means from a top view perspective of the aircraft, the propeller generates a lifting fore in a clockwise rotation; the reverse rotation propeller means from a top view perspective of the aircraft, the propeller generates the lifting force in a counter-clockwise rotation. The structure of the normal rotation propeller and the structure of the reverse rotation propeller are mirror symmetric.

The present disclosure also provides a propulsion assembly, including a driving member and a propeller described above. The propeller may be connected with an output shaft of the driving member through the wheel hub. The driving member may be an electric motor. The KV value of the electric motor may be 1300 rounds/(minute·volt), 1500 rounds/(minute·volt), or any value between the two values, such as 1400 rounds/(minute·volt).

In the propulsion assembly, by forming the first suppression member 180 through bending a portion of the front edge 150 of the blade adjacent to the blade tip 120 toward the rear edge 160, the spanwise air flow on the blade may be cut, thereby reducing the formation of the blade tip turbulence or reducing the intensity of the blade tip turbulence. As a result, the rotation noise of the propeller generated in the rotation process may be reduced, thereby improving the safety of the manned or unmanned aircraft (e.g., UAV or airship).

Figure 17:
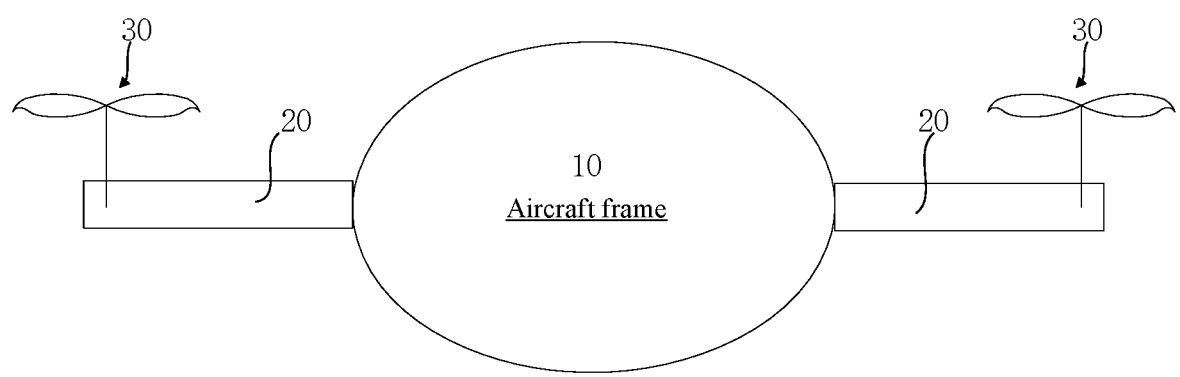
FIG. 17 is a schematic illustration of a structure of an aircraft, according to an example embodiment.

FIG. 17 is a schematic illustration of a structure of the aircraft. As shown in FIG. 17, the present disclosure also provides an aircraft, including an aircraft frame 10, an aircraft arm 20, and at least one propulsion assembly 30. An end of the aircraft arm 20 is connected with the aircraft frame 10. The other end of the aircraft arm 20 is configured for mounting the propulsion assembly 30. The above described aircraft may be a manned aircraft, such as an airship, or may be a rotor-based unmanned aircraft, such as a quad-rotor UAV. The aircraft may include the above described propulsion assembly 30. By forming the first suppression member 180 through bending a portion of the front edge 150 of the blade toward the rear edge 160, the spanwise air flow on the blade may be cut, thereby reducing the formation of the blade tip turbulence or reducing the intensity of the blade tip turbulence. As a result, the rotation noise generated by the propeller during the rotation process can be reduced, and the safety of the manned or unmanned aircraft (e.g., UAV or airship) can be improved.

In some embodiments, the aircraft arm 20 may be fixed to the aircraft frame 10 or may be rotatably connected with the aircraft frame 10. When the aircraft arm 20 is rotatably connected to the aircraft frame 10, the volume of the aircraft may be reduced, which makes it convenient for transportation and storage.

Finally, although the advantages related to some embodiments have been described in the context of the above embodiments, other embodiments may also have such advantages. Not all embodiments have explicitly described all advantages of the present disclosure. The advantages brought by the technical features of the embodiments should all be regarded as advantages that distinguish the present disclosure from the conventional technologies, which should belong to the scope of protection of the present disclosure.

What is claimed is:

1. A propeller, comprising:
   a blade including:
   a blade root;
   a blade tip disposed away from the blade root;
   a blade front surface;
   a blade back surface;
   a front edge connecting a first side of each of the blade front surface and the blade back surface;
   a rear edge connecting a second side of each of the blade front surface and the blade back surface;
   a central axis line; and
   a first suppression member formed by a portion of the front edge adjacent to the blade tip bending toward a first direction that is from the front edge to the rear edge, the first suppression member being located at a first side of the central axis line and configured to suppress a spanwise air flow;
   wherein:
   the blade tip is located at a second side of the central axis line opposite to the first side of the central axis line;
   rotation of the blade forms a propeller disk; and
   a ratio of a distance between the first suppression member and a center of the propeller disk to a radius of the propeller is about 79.4%-88.8%.

2. The propeller of claim 1,
   wherein each of the front edge and the rear edge includes a tangent in parallel with the central axis line, and
   wherein at least one of the blade tip and the first suppression member is located between the two tangents.

3. The propeller of claim 1, further comprising a second suppression member formed by a portion of the rear edge adjacent to the blade tip bending toward the first direction, wherein the second suppression member is configured to suppress the spanwise air flow.

4. The propeller of claim 3,
   wherein each of the front edge and the rear edge includes a tangent in parallel with the central axis line, and
   wherein the second suppression member is located between the two tangents.

5. The propeller of claim 1, wherein the blade front surface and the blade back surface are curved surfaces.

6. The propeller of claim 1, wherein the front edge includes an arched portion having a curved shape.

7. The propeller of claim 1, wherein the propeller includes multiple blades and a blade hub, wherein the multiple blades are uniformly disposed in a circumferential direction of the blade hub.

8. The propeller of claim 7, wherein the propeller is a self-tightening propeller, and wherein the blade hub of the self-tightening propeller includes a connection hole configured for connecting with an output shaft of an electric motor.

9. The propeller of claim 7, wherein the blade hub of the propeller includes a first connection member configured to connect the multiple blades, a second connection member configured to connect with a driving member, and third connection members separately disposed between the first connection member and the second connection member.

10. The propeller of claim 9, wherein the blade root includes a mounting hole.

11. The propeller of claim 1, wherein a thickness of the blade is configured to gradually reduce from the blade root to the blade tip.

12. A propulsion assembly, comprising:
    a driving member; and
    a propeller, comprising:
    a blade hub connected with an output shaft of the driving member; and
    a blade including:
    a blade root;
    a blade tip disposed away from the blade root;
    a blade front surface;
    a blade back surface;
    a front edge connecting a first side of each of the blade front surface and the blade back surface;
    a rear edge connecting a second side of each of the blade front surface and the blade back surface;
    a central axis line; and
    a first suppression member formed by a portion of the front edge adjacent to the blade tip bending toward a first direction that is from the front edge to the rear edge, the first suppression member being located at a first side of the central axis line and configured to suppress a spanwise air flow;

wherein:

the blade tip is located at a second side of the central axis line opposite to the first side of the central axis line;

rotation of the blade forms a propeller disk; and a ratio of a distance between the first suppression member and a center of the propeller disk to a radius of the propeller is about 79.4%-88.8%.

13. The propulsion assembly of claim 12, wherein each of the front edge and the rear edge includes a tangent in parallel with the central axis line, and wherein at least one of the blade tip and the first suppression member is located between the two tangents.

14. The propulsion assembly of claim 12, further comprising a second suppression member formed by a portion of the rear edge adjacent to the blade tip bending toward the first direction, wherein the second suppression member is configured to suppress the spanwise air flow.

15. The propulsion assembly of claim 14, wherein each of the front edge and the rear edge includes a tangent in parallel with the central axis line, and wherein the second suppression member is located between the two tangents.

16. The propulsion assembly of claim 12, wherein the blade front surface and the blade back surface are curved surfaces.

17. The propulsion assembly of claim 12, wherein the front edge includes an arched portion having a curved shape.

18. The propulsion assembly of claim 12, wherein the propeller includes multiple blades uniformly disposed in a circumferential direction of the blade hub.

19. The propulsion assembly of claim 18, wherein the propeller is a self-tightening propeller, and wherein the blade hub of the self-tightening propeller includes a connection hole configured for connecting with the output shaft of the driving member.

20. The propulsion assembly of claim 18, wherein the blade hub of the propeller includes a first connection member configured to connect the multiple blades, a second connection member configured to connect with the driving member, and third connection members separately disposed between the first connection member and the second connection member.

21. An aircraft, comprising:

an aircraft frame;

an aircraft arm; and a propulsion assembly, wherein an end of the aircraft arm is connected with the aircraft frame, the other end of the aircraft arm is connected with the propulsion assembly, wherein the propulsion assembly includes:

a driving member; and a propeller including:

a blade hub connected with an output shaft of the driving member; and a blade including:

a blade root;

a blade tip disposed away from the blade root;

a blade front surface;

a blade back surface;

a front edge connecting a first side of each of the blade front surface and the blade back surface;

a rear edge connecting a second side of each of the blade front surface and the blade back surface;

a central axis line; and a first suppression member formed by a portion of the front edge adjacent to the blade tip bending toward a first direction that is from the front edge to the rear edge, the first suppression member being located at a first side of the central axis line and configured to suppress a spanwise air flow;

wherein:

the blade tip is located at a second side of the central axis line opposite to the first side of the central axis line;

rotation of the blade forms a propeller disk; and a ratio of a distance between the first suppression member and a center of the propeller disk to a radius of the propeller is about 79.4%-88.8%.

* * * * *